Nov. 17, 1936.   V. W. BREWER   2,061,500
FERTILIZER AND PROCESS OF EFFECTING DISTRIBUTION THEREOF
Original Filed Oct. 10, 1932
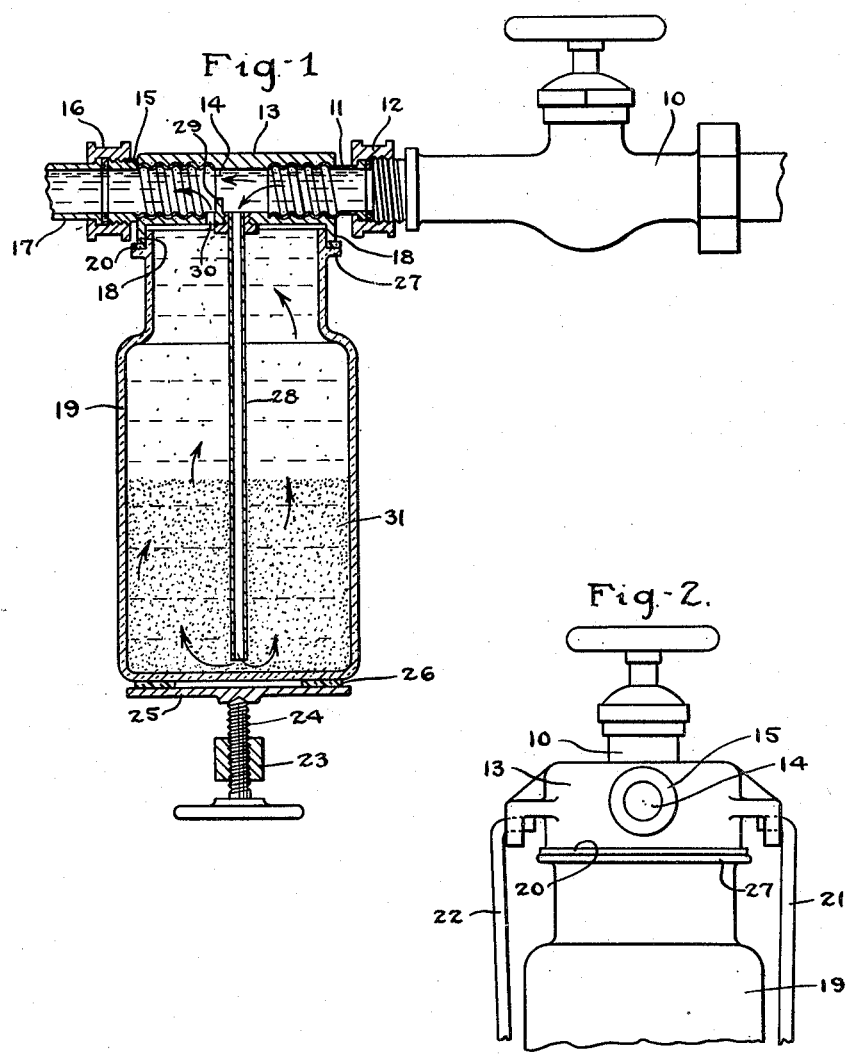
Inventor:
Vivian W. Brewer.
By Whiteley and Ruckman
Attorneys.

Patented Nov. 17, 1936

2,061,500

UNITED STATES PATENT OFFICE 2,061,500

FERTILIZER AND PROCESS OF EFFECTING DISTRIBUTION THEREOF

Vivian W. Brewer, Minneapolis, Minn., assignor to Gro-Lux, Incorporated, St. Paul, Minn., a corporation Refiled for abandoned application Serial No. 636,978, October 10, 1932. This application November 1, 1935, Serial No. 47,848

2 Claims. (Cl. 47—58)

My invention relates to fertilizers and process of effecting distribution thereof. It is the object of my invention to provide in connection with means for distributing in a stream of water fertilizer either of a soluble nature during and after the same shall go into solution, or of an insoluble nature which is so finely comminuted that it may be distributed in such finely comminuted state in the water stream. A difficulty in so distributing fertilizers is encountered from the fact that the receptacle containing the fertilizer (either soluble or insoluble), and through which some part of the distributing stream of water is caused to flow, cannot be entered, and the only means of determining when distribution has been completely effected is by visual inspection. But practically all the fertilizers adapted to be so distributed are transparent and, when in water, either in solution or in suspension, are completely or substantially invisible. It is the object of my invention to provide in combination with means for distributing fertilizer as above defined, means associated with the fertilizer and which will have no deteriorating effect thereon for rendering the fertilizer (either in solution or in suspension) visible until it has been completely exhausted from the container.

To this end I employ dry commercial fertilizer—nitrates, phosphates and the like—which I reduce to a coarse granular condition if said fertilizer is soluble, and to a fine powder if the fertilizer is insoluble, and add to this, dry, finely powdered dye material such as aniline dye or vegetable dyes, and thoroughly mix the dry dye material and fertilizer. This mixing is continued until all evidence of the presence of the dye material in the mixture disappears.

I have discovered that such dye materials when mixed dry with dry fertilizer materials have a tendency to remain adherent to the granules or dust particles of the fertilizer material. Where that material is soluble the dye will go into solution only as the fertilizer material is dissolved. Where the material is insoluble the dye particles will cling to the insoluble particles of fertilizer and stain them so that as seen in suspension in the water it will give an effect of coloration to the water. When this coloration finally disappears there is thus a visible indication that the fertilizer has been distributed, and continued flow of water will be stopped, important because the fertilizer, particularly where soluble fertilizer is employed, readily leaches through the ground with excess of moisture and should be retained near the surface not more than two inches down for grass.

The full objects and advantages of my invention will appear in connection with the detailed description thereof, and the novel features of my inventive idea will be particularly pointed out in the claims.

In the drawing, which illustrates the application of my invention in one form,—

Fig. 1 shows a sectional elevation of an apparatus designed to be employed for effecting the distribution above referred to. Fig. 2 shows a side elevation of a portion thereof taken at right angles to Fig. 1.

The specific apparatus, as such, forms no part of my invention and is illustrated as showing a form of apparatus in connection with which my invention may be operated. As there shown a faucet 10 of usual construction such as projects from the side of a house is adapted to have secured thereto an extension member 11 which is secured in water-tight position by the usual packing nut 12. This member carries a piece or casting 13 having a tubular bore 14 extending through the same, the piece being threaded on the extension member 11 and on a second coupling member 15 which is secured by hose coupling 16 to hose 17 in the well-known way. The piece 13 is provided with an annular socket 18 adapted to receive the neck of a jar or bottle 19, such as an ordinary fruit jar, being secured against the same with a gasket 20 between, by means of a clamping device comprising side arms 21, 22 supporting a crossbar 23 in which is threaded a hand screw 24 taking against a piece 25 formed with a rubber contact member 26 which engages the bottom of the jar 19. By screwing up on the hand screw 24 the shoulder 27 of the jar neck may be forced toward the edge of the annular gasket 18, compressing the gasket 20 between them and removably securing the jar in water-tight relation upon the casting 13.

Extending from the casting 13 and opening into the tubular chamber 14 is a tube 28 of such length as to open adjacent the bottom of jar 19. Immediately in front of the opening of the tube 18 into the tubular chamber 14 is a baffle 29, and directly back of the baffle 29 is a small duct 30 opening into the jar 19. The water being delivered under pressure from the faucet 10 will some part travel down through tube 28 into the bottom of jar 19 and return through duct 30 into the chamber, first filling the jar 19 with water and then gradually effecting change of the contents of the jar.

The composite material which I have heretofore described, consisting of dry fertilizer having applied thereto some form of dye, is shown at 31 in Fig. 1.

This material, which may be of any of the commercial forms of dry nitrates or dry phosphates, if in a soluble form, is first crushed or comminuted to a coarse granular form which will pass a five to ten mesh screen. There is added thereto, and while it is in the dry state, a suitable amount of dye material such as "Aniline Dark Green C B Union Merco" with a soluble urea, although I do not wish to limit myself to the use of aniline dyes, since some vegetable dyes are effective for the purpose. A preferred proportion of the dye to be employed and which I have found gives satisfactory results is two to four parts by weight of dye material to five thousand parts by weight of fertilizer material. This mixture uncolored when dry has the advantage that it will not color lawn grass and garden flowers and vegetables and spoil their appearance when it dries thereon. In the case of insoluble fertilizer material, such as some forms of phosphates, these are first pulverized to produce as fine a comminution as possible and then there is added thereto an amount of dye material, preferably about one-third greater in proportion than that which is added to the soluble fertilizer material. In either case, after the dye material has been added the dry fertilizer including it is thoroughly agitated and stirred, as in a rotating drum, until all evidence of the presence of the dye has disappeared. With the amounts of dye employed this will happen, the very fine particles of dye coalescing severally with the particles of the fertilizer and showing substantially no color until water has been added. When, therefore, the jar 19 containing the material 31 has been secured in position, the fertilizer material in it will appear white or crystalline or as having the color of the fertilizer as procured on the market. When, however, the water is turned on from the faucet 10 and the jar 19 fills with water, and, in the case of soluble fertilizer material, it begins to dissolve, some of the dye will go into solution with the fertilizer, coloring the water green or yellow, or whatever color may have been selected. As the material continues to dissolve, this solution of dye will continue to take place, and thereafter when all of the fertilizer material has been removed from the jar 19 by the distribution system the passing of this color from the jar furnishes definite indication that the fertilizer has been distributed. In the case of insoluble fertilizer, as soon as water enters the jar 19 and contacts with and wets the numerous small particles of insoluble fertilizer, the dye will have the effect of staining these particles, so that as they are driven up into the water of the jar a color effect is produced as if the water itself were colored, and which effect will continue as long as there are particles of the fertilizer in the jar, but will terminate as soon as all of said particles have been removed, thus indicating full distribution of the fertilizer.

The advantages of my invention clearly appear from the foregoing. It makes it possible to use such a distribution system in connection with the sprinkling of lawns and the like with precision and accuracy, and cuts out uncertainties. At the same time it insures that all of the fertilizer in the jar, and which has been subjected to the water flow, will be distributed, and that the application of water to the ground will be terminated, as it should be, as soon as the charge of fertilizer has been distributed.

I claim:

1. A method of distributing fertilizer which consists in applying dye material to powdered fertilizer when both are dry and cold, the dye in a dry state being insufficient to color the objects with which it comes in contact, agitating the mixture of fertilizer and dye in the dry state until the dye particles have coalesced with the fertilizer particles, placing the material so prepared in a transparent container, passing a stream of water through said container and the material therein whereby the dye in conjunction with the fertilizer material will produce a color effect visible in the container, and continuing to pass water through said container and spray it upon the plot to be fertilized until the color effect in the container disappears.

2. A method of distributing fertilizer which consists in introducing dye material into powdered fertilizer in the proportion of two to four parts by weight of dye material to five thousand parts by weight of fertilizer material when both are dry and cold, the dye in a dry state being insufficient to color the objects with which it comes in contact, agitating the mixture of fertilizer and dye in the dry state until the dye particles have coalesced with the fertilizer particles, placing the material so prepared in a transparent container, passing a stream of water through said container and the material therein whereby the dye in conjunction with the fertilizer material will produce a color effect visible in the container, and continuing to pass water through said container and spray it upon the plot to be fertilized until the color effect in the container disappears.

VIVIAN W. BREWER.